US012528011B2

(12) United States Patent
Li et al.

(10) Patent No.: US 12,528,011 B2

(45) Date of Patent: Jan. 20, 2026

(54) FORCE FEEDBACK DEVICE

(71) Applicant: AAC Acoustic Technologies (Shanghai)Co., Ltd., Shanghai (CN)

(72) Inventors: Yuntong Li, Shanghai (CN); Liang Jiang, Shanghai (CN); Bing Xie, Shanghai (CN); Simon Forest, Ottawa (CA); Neil Olien, Ottawa (CA)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 415 days.

(21) Appl. No.: 18/356,262

(22) Filed: Jul. 21, 2023

(65) Prior Publication Data

US 2024/0033620 A1 Feb. 1, 2024

(30) Foreign Application Priority Data

Jul. 29, 2022 (CN) ......................... 202210908284.9
Feb. 16, 2023 (CN) ......................... 202310126774.8

(51) Int. Cl.

*A63F 13/285* (2014.01)
*A63F 13/218* (2014.01)
*A63F 13/24* (2014.01)

(52) U.S. Cl.

CPC .......... *A63F 13/285* (2014.09); *A63F 13/218* (2014.09); *A63F 13/24* (2014.09); *A63F 2300/1037* (2013.01)

(58) Field of Classification Search

CPC ....... A63F 13/24; A63F 13/285; A63F 13/218
See application file for complete search history.

(56) References Cited

U.S. PATENT DOCUMENTS 5,643,087 A * 7/1997 Marcus ................. A63F 13/833 463/38
6,020,875 A * 2/2000 Moore .................. A63F 13/428 345/157
8,545,323 B2 * 10/2013 McVicar ............... A63F 13/235 345/161
12,222,742 B2 * 2/2025 Li ........................... A63F 13/20

FOREIGN PATENT DOCUMENTS

CN 213781884 U * 7/2021
WO WO-2017130562 A1 * 8/2017 ............. A61B 37/74

* cited by examiner

*Primary Examiner* — John A Tweel, Jr.

(74) *Attorney, Agent, or Firm* — Wiersch Law Group

(57) ABSTRACT

A force feedback device includes a base, a working body, a driving assembly, and a transmission structure. The working body includes a key assembly and a working surface. The working surface is disposed on the key assembly. The working body is rotatably connected to the base through a first transmission shaft. The driving assembly is rotatably disposed on the base. The driving assembly is disposed opposite to the working surface. The transmission structure is disposed on the working surface. The transmission structure is in transmission connection with the driving assembly. Compared with the related art, the first transmission shaft of the driving assembly provides forward and reverse rotation to drive the transmission structure to realize force feedback effects, which is compact in overall space, small in friction resistance, and facilitates user experience effect.

16 Claims, 10 Drawing Sheets

A-A

FORCE FEEDBACK DEVICE

TECHNICAL FIELD

The present invention relates to the field of force feedback, and in particular to a force feedback device.

BACKGROUND

With development of network technology and electronic information technology, more and more games are developed, and various operating handles, virtual reality equipment, and augmented reality equipment are further developed, and sensory requirements of users when using external equipment become higher and higher.

Triggers on various handles or peripherals of related technologies are directly connected to keys, which cannot be adjusted according to different game scenes. Some related technologies only provide a certain vibration feedback, which is difficult to give the users a good gaming experience, and cannot provide the users with an immersive game experience. Force feedback serves as an important characteristic in tactile feedback along with development of different electronic devices, and especially with an evolution of personal consumption electronic products, the force feedback becomes widely valued.

However, force feedback devices of the related technologies are large in layout space and friction force, and poor in feedback force control effect, which cannot provide a good user experience.

Therefore, it is necessary to provide a new force feedback device to solve the above problems.

SUMMARY

The present invention aims to provide a force feedback device which is compact in overall space, small in friction resistance and inertia, smooth and controllable in feedback force, and good in user experience effect.

In order to solve the above technical problems, the present invention provides a force feedback device, including a base, a working body, a driving assembly, and a transmission structure.

The working body includes a key assembly and a working surface. The working surface is disposed on the key assembly. The working body is rotatably connected to the base through a first transmission shaft.

The driving assembly is rotatably disposed on the base. The driving assembly is disposed opposite to the working surface.

The transmission structure is disposed on the working surface. The transmission structure is in transmission connection with the driving assembly. Two ends of the transmission structure respectively extend along the working surface. The two ends of the transmission structure are fixed to two ends of the working surface. The driving assembly drives the transmission structure to adjust the working surface to rotate around the first transmission shaft, so as to generate force feedback in response to operation of touch or press on the key assembly.

As an improvement, the transmission structure is a connecting belt or a connecting rope.

As an improvement, two opposite ends of the working surface include a first end stop surface and a second end stop surface. The two ends of the transmission structure are respectively fixed to the first end stop surface and the second end stop surface.

As an improvement, the driving assembly includes a driving unit and a transmission shaft. The driving unit is fixed to one side of the base. The transmission shaft is connected to the driving unit. The transmission shaft is rotatably disposed on the base and is opposite to the working surface. The driving unit drives the transmission shaft to drive the transmission structure to adjust rotation of the working surface, so as to generate the force feedback in response to the operation of touch or press on the key assembly.

As an improvement, the transmission structure includes a coil, two supporting-free transmission portions, and two supporting transmission portions. The coil surrounds the transmission shaft. The two supporting-free transmission portions are respectively connected to two ends of the coil. The two supporting transmission portions are respectively connected to the two supporting-free transmission portions. Tail ends of the two supporting transmission portions are respectively fixed to the first end stop surface and the second end stop surface. The driving unit drives the transmission shaft to rotate to drive the coil to contract, so as to adjust positions of the first end stop surface and the second end stop surface at the tail ends of the two supporting transmission portions.

As an improvement, a driving surface is formed on a periphery of the transmission shaft. The driving surface is directly disposed in the coil. The transmission shaft rotates to enable the driving surface to drive the coil to move, so as to adjust positions of the two supporting-free transmission portions.

As an improvement, the key assembly includes a key body and a key. The key is formed by extending a peripheral side of the key body. The working surface includes an arc-shaped periphery. The working surface is disposed on the key body. The key body is rotatably connected to the base through the first transmission shaft.

As an improvement, the key body, the key, and the working surface are integrally formed.

As an improvement, the key assembly further includes at least two cylinders fixed on the working surface. The at least two cylinders are disposed at intervals, and adjacent two of the at least two cylinders are disposed in a staggered manner along a direction perpendicular to the transmission shaft. The transmission structure is sequentially wound around each of the at least two cylinders, and the transmission structure is fixed to an end portion of the working surface.

As an improvement, the at least two cylinders are disposed on a same side of the transmission shaft.

As an improvement, the base includes a base body and a first supporting plate. The first supporting plate is formed by the base body. The first transmission shaft is located on two opposite sides of the key body and is supported respectively on the base body and the first supporting plate to form respective rotatable connection. The driving unit drives the transmission shaft to drive the transmission structure, so that the working surface drives the first transmission shaft to rotate on the first supporting plate, so as to generate the force feedback in response to the operation of touch or press on the key assembly.

As an improvement, the key assembly further includes first bearings. The first bearings are respectively fixed to the first transmission shaft and sleeved on the first transmission shaft. The key assembly is respectively and rotatably connected to the base body and the first supporting plate through the first bearings.

As an improvement, the base further includes a second supporting plate fixed in the base body. The key assembly further includes a side swing plate, a second transmission shaft, and a gear. The side swing plate extends from the key body along a direction close to the working surface. The second transmission shaft is supported on the second supporting plate to form rotatable connection. The gear is disposed on a side, distal from the driving unit, of the second supporting plate, and the gear is fixed to the second transmission shaft. The working surface is disposed on a side, close to the driving unit, of the second supporting plate, and the working surface is fixedly connected to the second transmission shaft. An inner gear structure is disposed at one end, close to the gear, of the side swing plate, and the gear is meshed with the inner gear structure.

As an improvement, the force feedback device further includes a position sensor. The position sensor is fixed on the base, and the position sensor is connected to one end of the first transmission shaft.

As an improvement, the force feedback device further includes torsion springs. The torsion springs are respectively sleeved on the first transmission shaft. A first end of each of the torsion springs abuts against the key, and a second end of each of the torsion springs abuts against the base.

As an improvement, two tension adjusting mechanisms are further disposed on two opposite ends of the working surface, and the two ends of the transmission structure are respectively connected to the two tension adjusting mechanisms.

Compared with related art, the working body of the force feedback device of the present invention includes the key assembly and the working surface. The working surface is disposed on the key assembly. The working body is rotatably connected to the base through a first transmission shaft. The driving assembly is rotatably disposed on the base and is disposed opposite to the working surface. The transmission structure is disposed on the working surface and is in transmission connection with the driving assembly. The two ends of the transmission structure respectively extend along the working surface and are fixed to two ends of the working surface. The driving assembly drives the transmission structure to adjust the working surface to rotate around the first transmission shaft, so as to generate the force feedback in response to the operation of touch or press on the key assembly. When touching or pressing the key assembly, the driving assembly provides forward and reverse rotation to drive the transmission structure to realize force feedback effects, which is compact in overall space, small in friction resistance, and facilitates user experience effect.

BRIEF DESCRIPTION OF DRAWINGS

In order to more clearly illustrate technical solutions in embodiments of the present invention, drawings required in descriptions of the embodiments are briefly described below. Obviously, the drawings in the following descriptions are merely some embodiments of the present invention. For a person of ordinary skill in art, other drawings are obtained according to the drawings without creative efforts.

Figure 1:
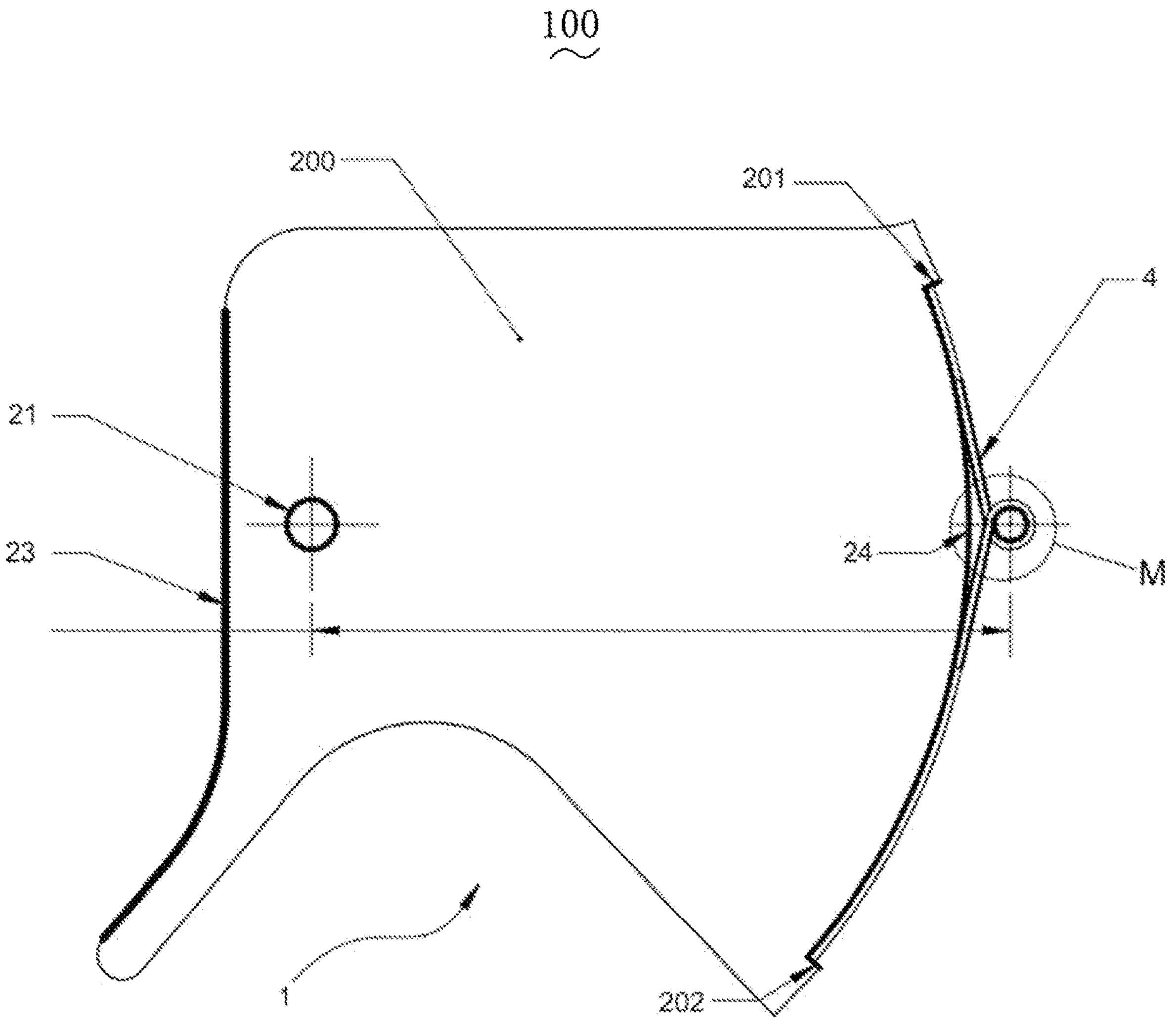
FIG. 1 is a schematic diagram of a force feedback device according to one embodiment of the present invention.

Reference number in the drawings: 100. force feedback device; 1. base; 101. base body; 103. first supporting plate; 104. second supporting plate; 2. key assembly; 21. first transmission shaft; 22. key body; 23. key; 24. working surface; 241. side swing plate; 2411. inner gear structure; 242. gear; 243. second transmission shaft; 3. driving assembly; 31. transmission shaft; 32. driving unit; 33. coupler; 4. transmission structure; 5. circular column; 6. first bearings; 7. second bearings; 8. third bearings; 9. position sensor; 10. torsion spring; 11. tension adjusting mechanism; 12. bolt; 200. working body; 201. first end stop surface; 202. second end stop surface; 203. coil; 204. supporting-free transmission portions; 205. supporting transmission portions; 206. driving surface; 207. driving surface center; 208. working surface center.

DETAILED DESCRIPTION OF EMBODIMENTS

Technical solutions in embodiments of the present invention are clearly and completely described below with reference to accompanying drawings in the embodiments of the present invention. Obviously, the described embodiments are only a part of the embodiments of the present invention, not all of the embodiments. All other embodiments obtained by a person of ordinary skill in art based on the embodiments of the present invention without creative efforts shall fall within a protection scope of the present invention.

Figure 2:
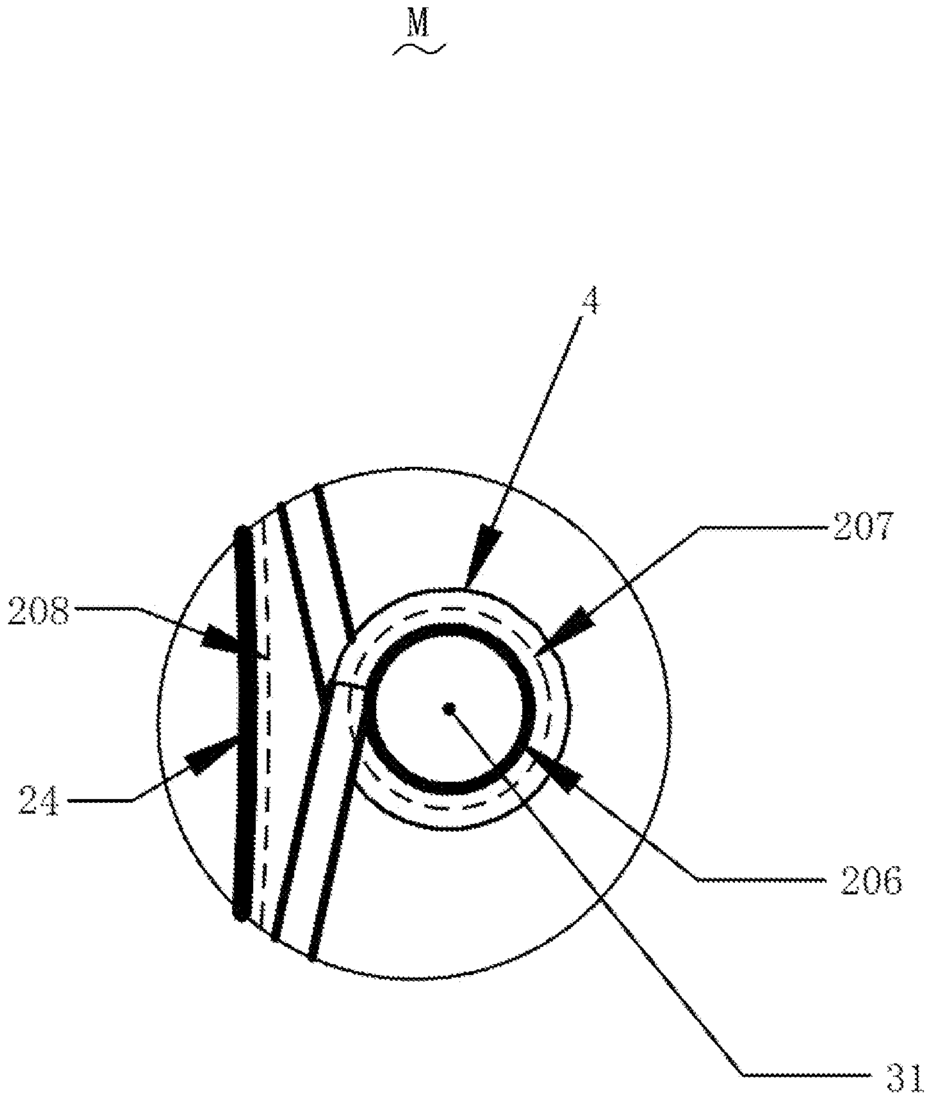
FIG. 2 is a partial enlarged schematic diagram of portion M shown in FIG. 1.
Figure 3:
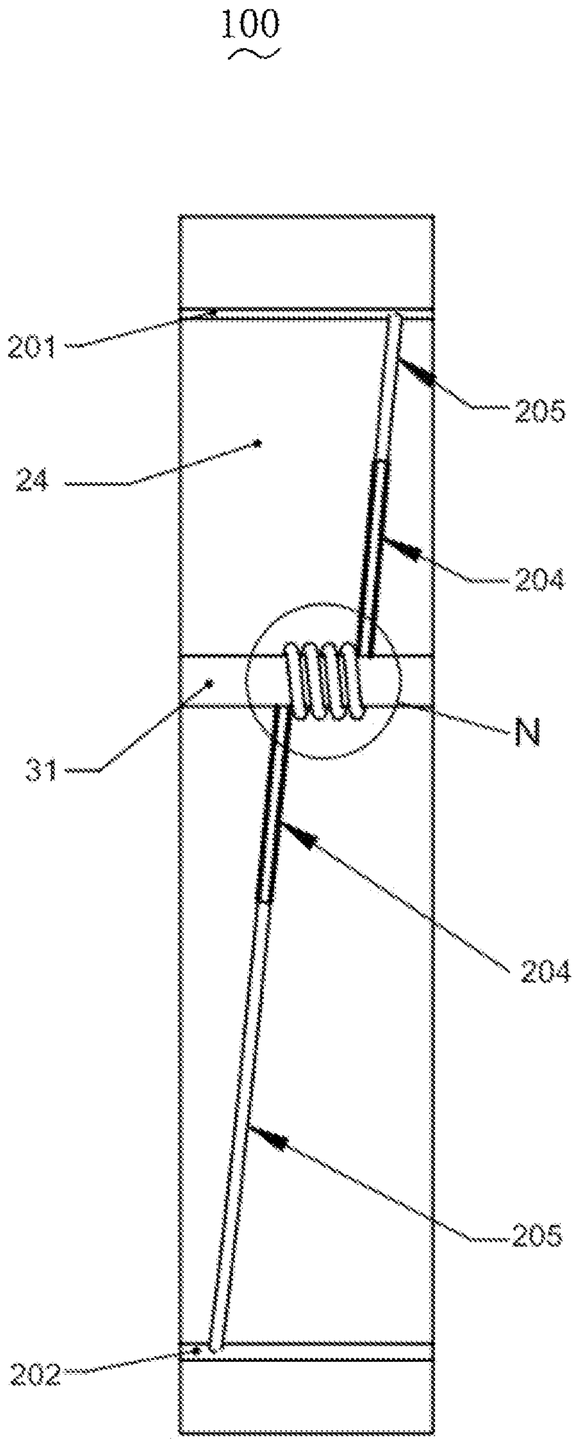
FIG. 3 is a schematic diagram of a right-side view of FIG. 1.
Figure 4:
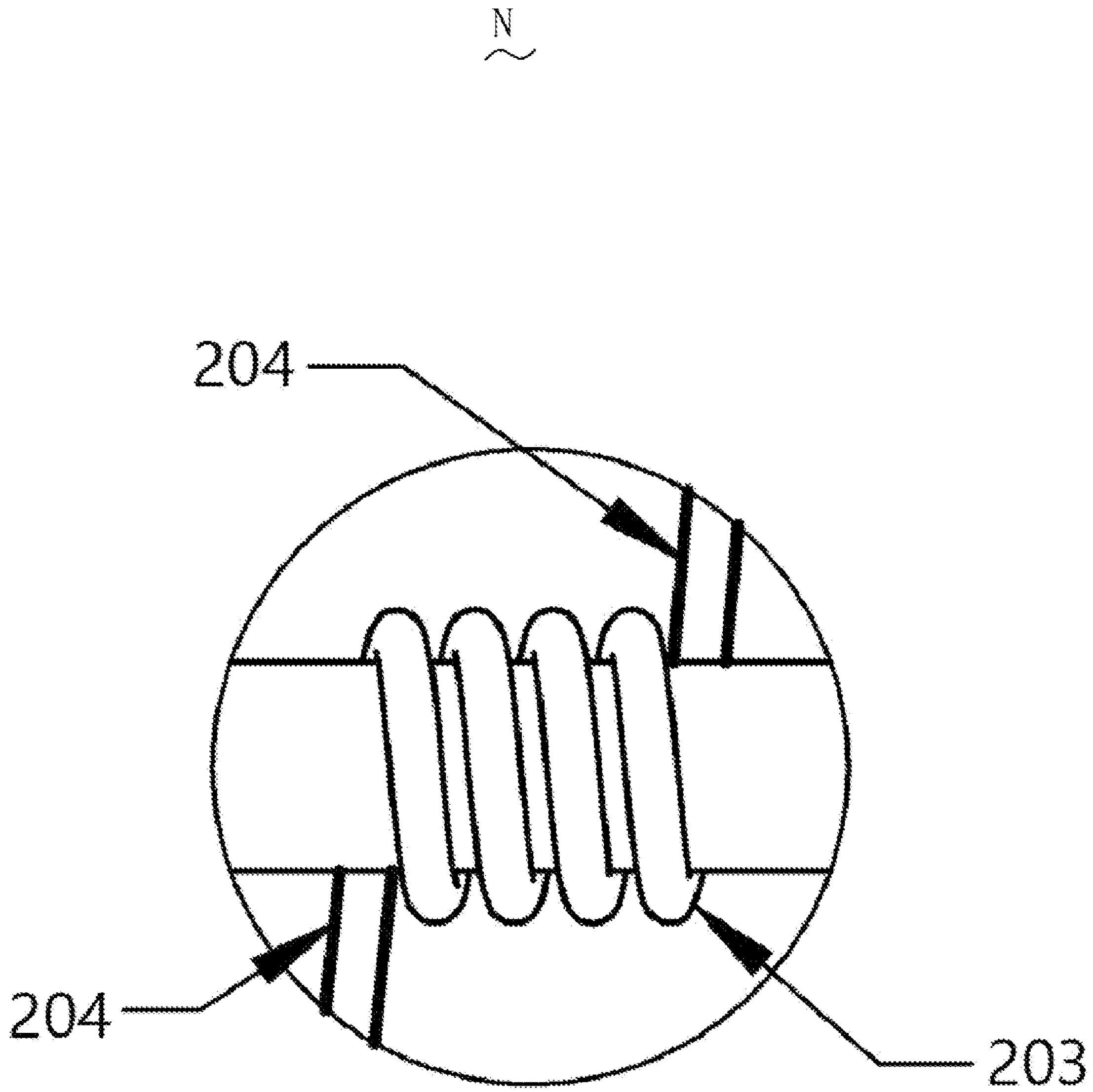
FIG. 4 is a partial enlarged schematic diagram of portion N shown in FIG. 3.

As shown in FIGS. 1-4, the present invention provides a force feedback device 100, including a base 1, a working body 200, a transmission structure 4, and a driving assembly 3. The working body 200 is rotatably connected to the base 1 through a first transmission shaft 21. The working body 200 is detachably fixed to the base 1. The working body 200 includes a key assembly 2 and a working surface 24. The working surface 24 is disposed on the key assembly 2. Two ends of the transmission structure 4 are respectively fixed to two ends of the working surface 24. The driving assembly 3 drives the transmission structure 4 to adjust the working surface 24 to rotate around the first transmission shaft 21, so as to generate force feedback in response to operation of touch or press on the key assembly 2, thereby improving experience effect of user operation.

The driving assembly 3 is rotatably disposed on the base 1. The driving assembly 3 is disposed opposite to the working surface 24. The transmission structure 4 is disposed on the working surface 24 and is in transmission connection with the driving assembly 3. The two ends of the transmission structure 4 respectively extend along the working surface 24 and are fixed to two ends of the working surface 24. The driving assembly 3 drives the transmission structure 4 to adjust the working surface 24 to rotate around the first transmission shaft 21, so as to generate force feedback in response to operation of touch or press on the key assembly 2. When touching or pressing the key assembly, the driving assembly 3 provides forward and reverse rotation to drive the transmission structure 4 to realize force feedback effects, which is compact in overall space, small in friction resistance, and facilitates user experience effect.

In the embodiment, the transmission structure 4 is a connecting belt or a connecting rope. The transmission shaft 31 is wrapped about several circles through the connecting rope or the connecting belt, two ends of the connecting rope or two ends of the connecting belt are ensured to be parallel and be close to an arc surface of the working surface 24, and the two ends of the connecting belt are respectively fixed on the two ends of the working surface 24. An initial position of the transmission shaft 31 is disposed at a position with respect to a midpoint of the arc surface of the working surface 24. The two ends of the connecting belt are fixed to the two ends of the arc surface. Through rope transmission or belt transmission, torque of the transmission shaft 31 is amplified on the first transmission shaft 21 of the key 23, and feedback is generated.

In the embodiment, the transmission shaft 31 is a capstan. The capstan and the key 23 are driven through the connecting belt or the connecting rope. The connecting belt or the connecting rope cannot have obvious ductility, cannot be stretched, and needs certain abrasion resistance and strength. The capstan and the key 23 are close to the working surface 24, and a gap is formed. The connecting belt or the connecting rope is wrapped around the capstan a plurality of circles, and then the connecting belt or the connecting rope is close to the working surface 24 around the arc surface, so that the transmission effects are good.

Optionally, the capstan abuts against the working surface 24, the capstan and the working surface 24 are transmitted through the connecting belt or the connecting rope, which is compact in structure, and adapts to a smaller space.

Optionally, a gap is formed between the capstan and the working surface 24, which is convenient for setting a plurality of connecting belts or a plurality of connecting ropes for transmission.

Embodiment 1

Figure 5:
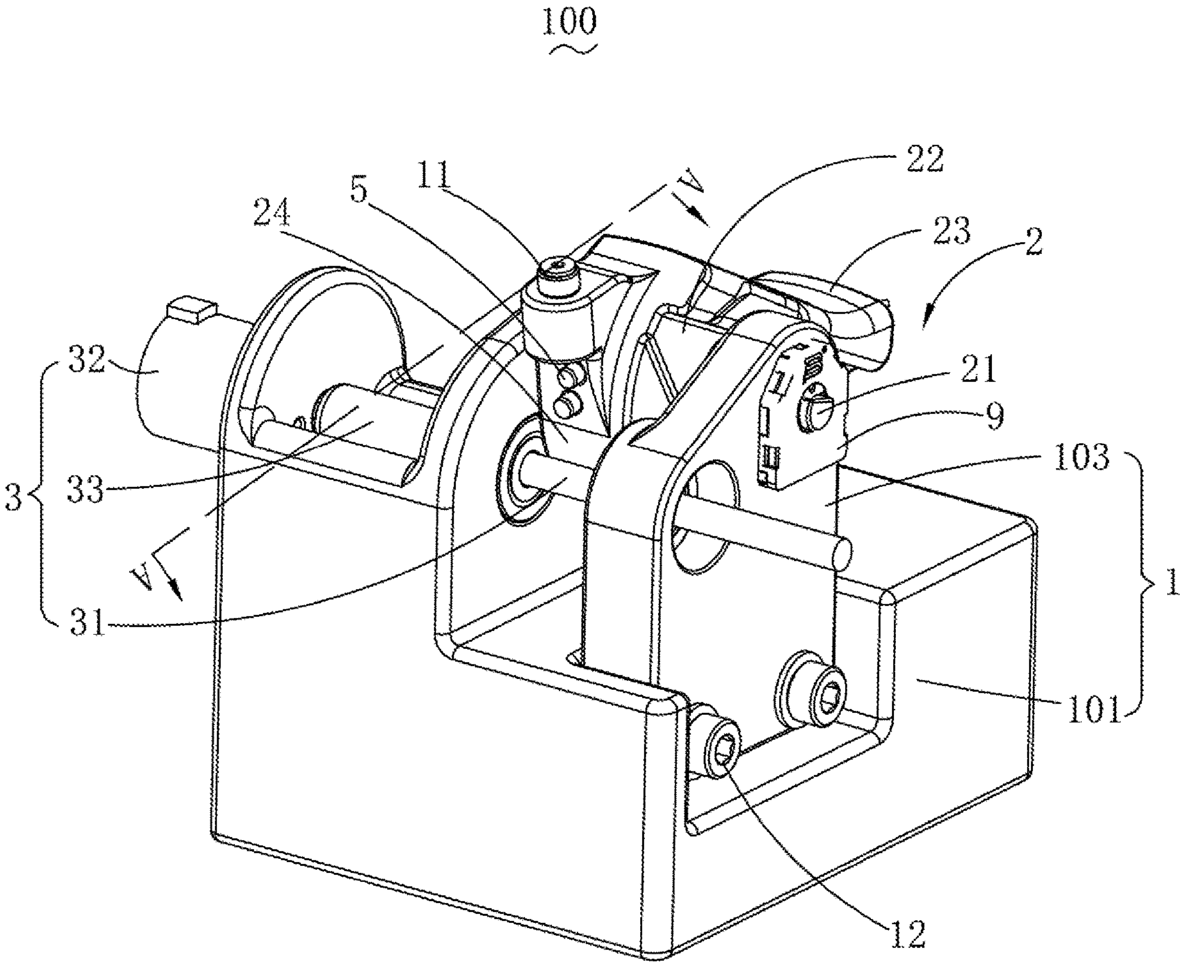
FIG. 5 is a structural schematic diagram of the force feedback device according to one embodiment of the present invention.
Figure 6:
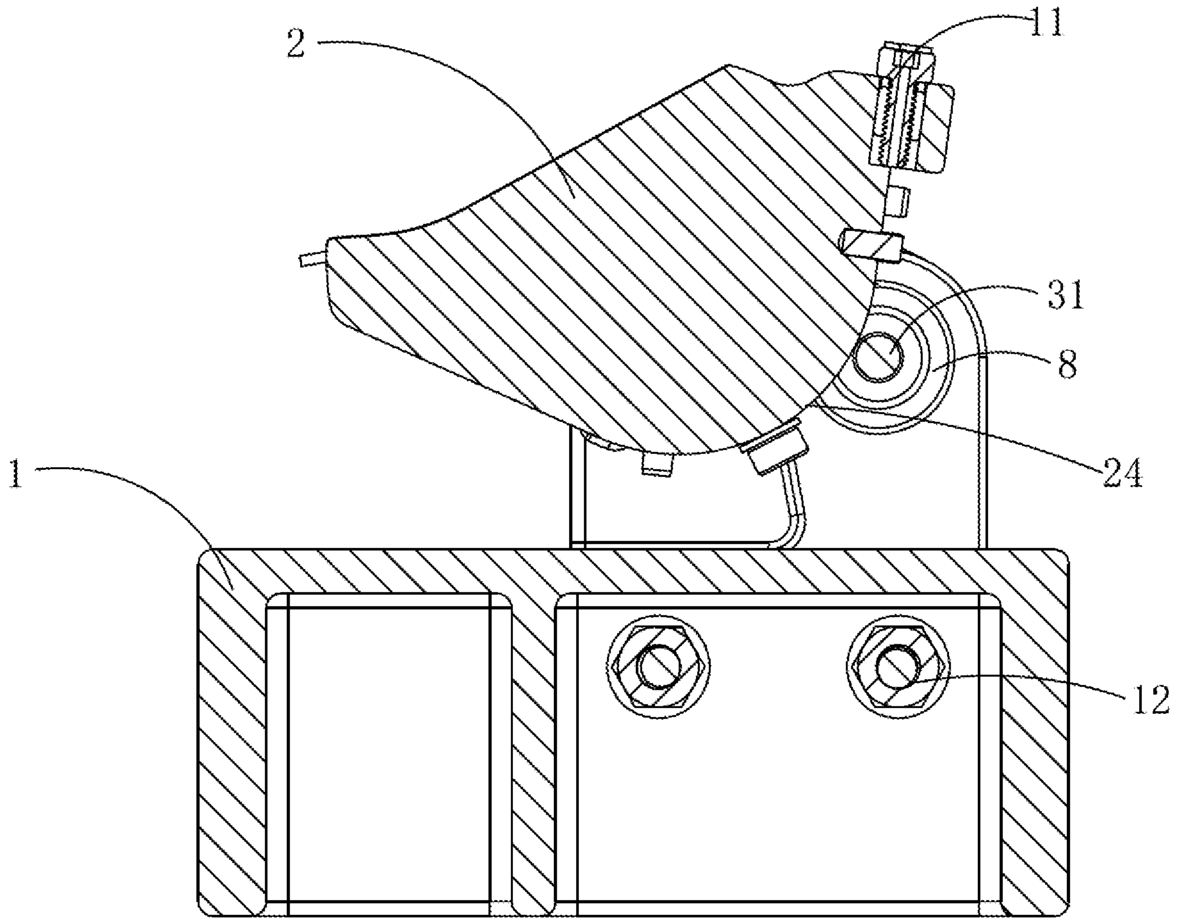
FIG. 6 is a schematic diagram of a cross-sectional view taken along the line A-A of FIG. 5.
Figure 7:
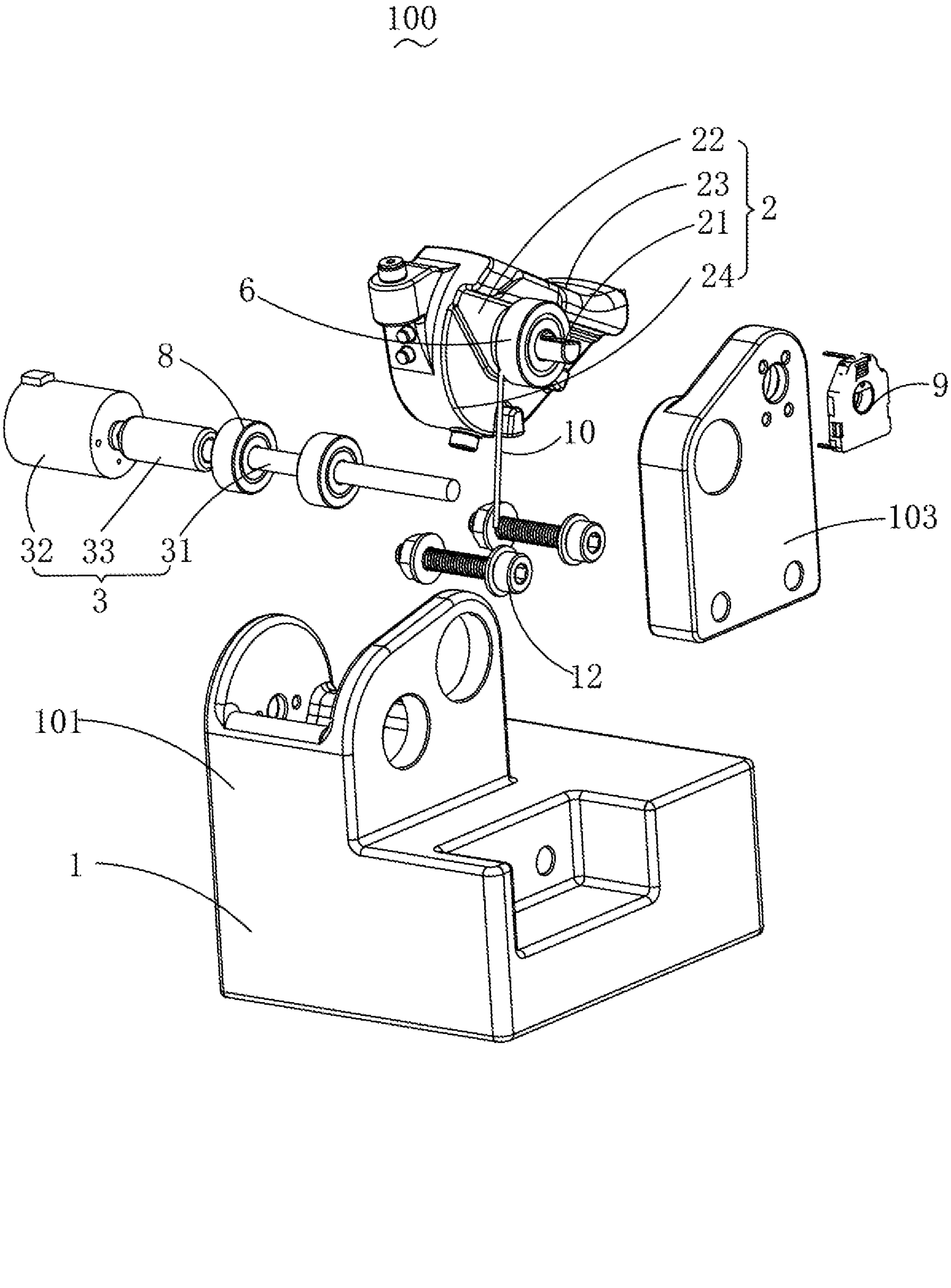
FIG. 7 is a schematic diagram of an exploded view of FIG. 5.
Figure 8:
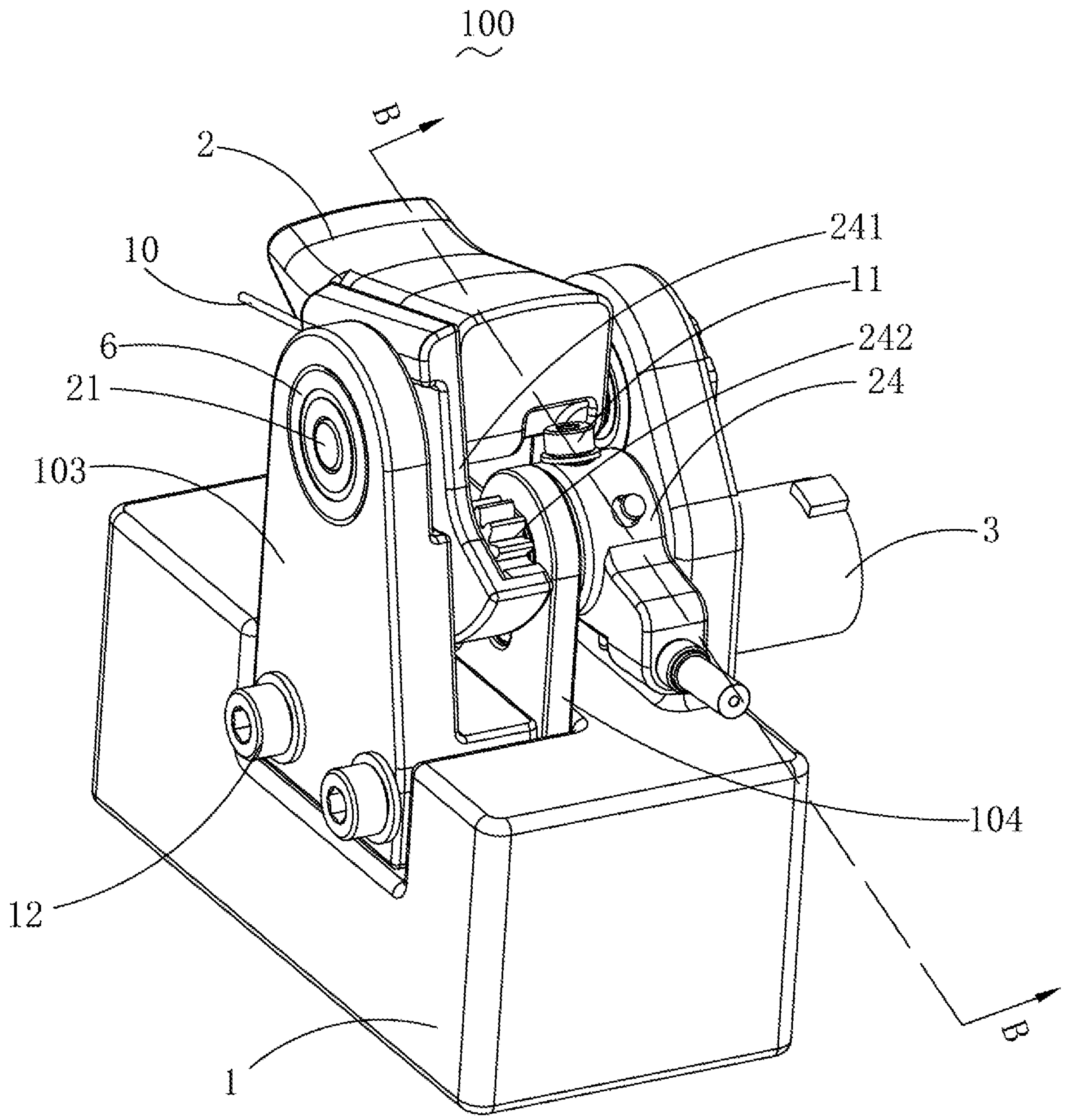
FIG. 8 is a structural schematic diagram of the force feedback device according to one embodiment of the present invention.
Figure 9:
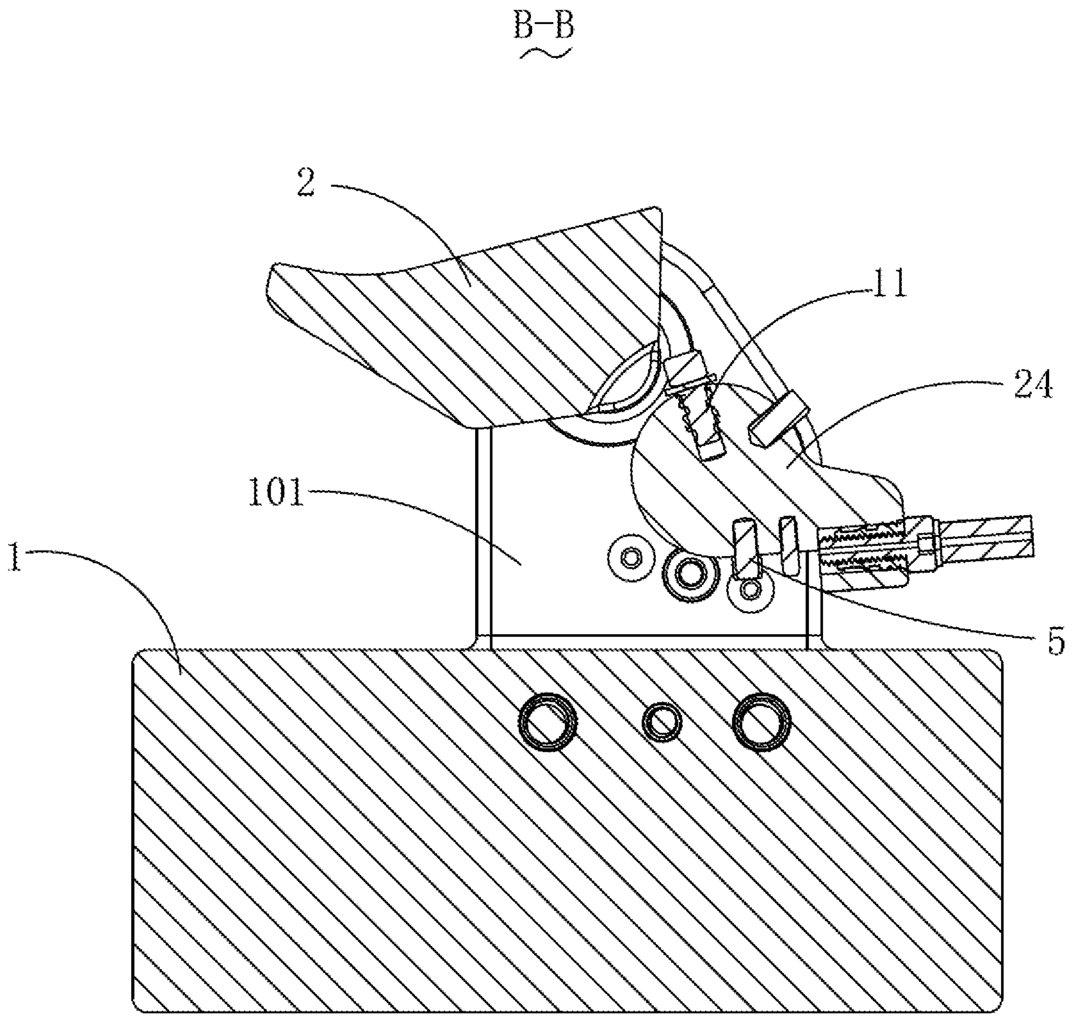
FIG. 9 is a schematic diagram of a cross-sectional taken along the line B-B of FIG. 8.
Figure 10:
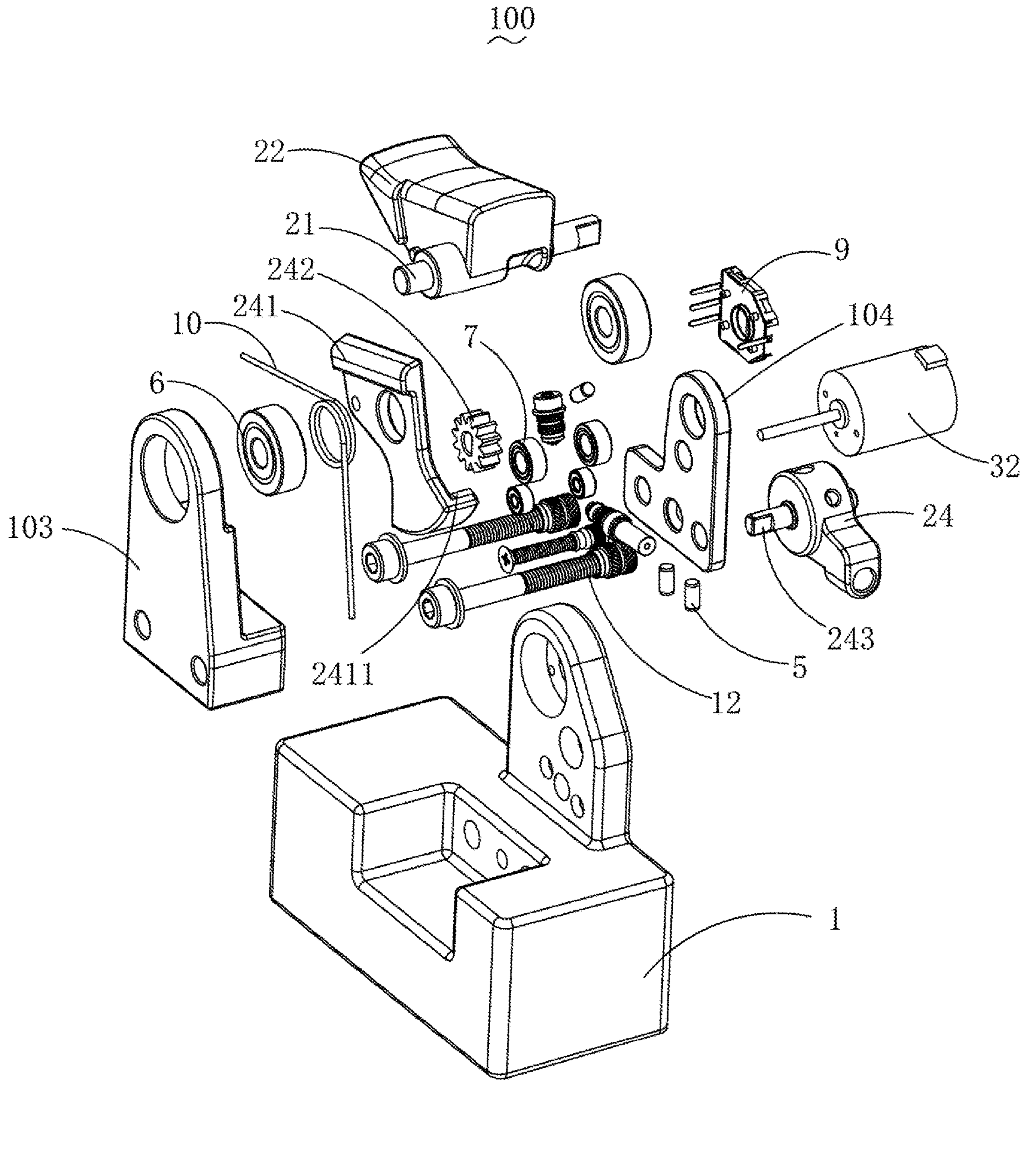
FIG. 10 is an exploded schematic diagram of FIG. 8.

As shown in FIGS. 5-10, the embodiment 1 provides a force feedback device 100, including a base 1, a key assembly 2, a driving assembly 3, and a transmission structure 4.

The base 1 is configured to support and install the key assembly 2 and the driving assembly 3.

The key assembly 2 includes a key body 22, a first transmission shaft 21, a key 23, and a working surface 24. The first transmission shaft 21 protrudes and extends from two opposite sides of the key body 22. The key 23 is formed by extending from a peripheral side of the key body 22. The working surface 24 includes an arc-shaped periphery, and the working surface 24 is connected to the key body 22. Through pressing the key 23, the key body 22 rotates on the first transmission shaft 21, and the working surface 24 takes the first transmission shaft 21 as a center and rotates along with the first transmission shaft 21. A limiting block is disposed between the key assembly 2 and the base 1, where the limiting block is not shown in the figures. The limiting block is configured to ensure itinerary fixation of the key 23. The working surface 24 includes a cylindrical surface taking the first transmission shaft 21 as a center, and the working surface may also be any similar complex geometry, such as helical grooves, cam profiles, etc.

The driving assembly 3 is fixed on one side of the base 1. The driving assembly 3 includes a driving unit 32 and a transmission shaft 31. The transmission shaft 31 is connected to the driving unit 32, the transmission shaft 31 is rotatably disposed on the base 1, and the transmission shaft 31 is disposed opposite to the working surface 24. The transmission structure 4 is disposed on the working surface 24. The transmission structure 4 is in transmission connection with the transmission shaft 31. Two ends of the transmission structure 4 respectively extend along the working surface 24. The two ends of the transmission structure 4 are fixed to two ends of the working surface 24. The driving unit 32 drives the transmission shaft 31 to drive the transmission structure 4 to adjust rotation of the working surface 24, so as to generate force feedback in response to operation of touch or press on the key assembly 2.

The transmission structure 4 is made of flexible materials. The transmission structure 4 cannot have obvious ductility, cannot be stretched, and has certain abrasion resistance and strength. A transmission ratio is adjusted through adjusting a diameter of the transmission shaft 31 and a diameter of the working surface 24 matched with the transmission shaft 31. When radius of the transmission shaft 31 and radius of the working surface 24 are constant, the transmission ratio is fixed. The transmission ratio is adjusted when the radius of the transmission shaft 31 and the radius of the working surface 24 are functions of angular rotation of the working surface 24 or the transmission shaft 31. Preferably, the transmission ratio of the transmission shaft 31 to the working surface 24 is 31:1, and certainly, other different transmission ratios are selected specifically according to actual conditions.

Specifically, the key assembly 2 is rotatably disposed on the base 1 for operation. The key assembly 2 is connected to the base 1 through the first transmission shaft 21. The key assembly 2 includes the key 23 and the working surface 24. The key 23 is formed by extending from the peripheral side of the key body 22. The working surface 24 includes the arc-shaped periphery, and the working surface 24 is connected to the key body 22. The driving assembly 3 is fixed on the one side of the base 1. The transmission shaft 31 of the driving assembly 3 is rotatably disposed on the base 1, and the transmission shaft 31 is disposed opposite to the working surface 24. The transmission structure 4 is disposed surrounding the transmission shaft 31. The two ends of the transmission structure 4 are respectively around the working surface 24, and the two ends of the transmission structure 4 are fixed to the two ends of the working surface 24. When pressing the key 23, the driving unit 32 drives the transmission shaft 31 to rotate forwards and backwards to drive the transmission structure 4 to achieve force feedback effects of the key 23, which is compact in overall space, small in friction resistance, and facilitates user experience effect.

In the embodiment 1, the transmission structure 4, interacting with the working surface 34, forms a working surface center 208. The working surface center 208 is an imaginary line offset from the working surface, and the working surface center 208 is centered on a cross section of the transmission structure. The transmission structure interacts with a transmission surface to form a transmission surface center. The transmission surface center is offset from an imaginary line of the transmission surface, and the transmission surface center is located at a center of the cross section of the transmission structure.

The transmission structure 4 connects the key body 22 to the transmission shaft 31 to form a uniform whole, and converts rotation of driving components in reverse rotation of components below the transmission shaft or the key body, where the driving components are the transmission shaft or the key body. If the working surface center and a driving surface center 207 have instantaneous rotation radius of different lengths, the rotation of the components below the transmission shaft or the key body is accompanied by a change in amount of rotation thereof compared to the driving components.

In the embodiment 1, two opposite ends of the working surface 24 include a first end stop surface 201 and a second end stop surface 202. The two ends of the transmission structure 4 are respectively fixed to the first end stop surface 201 and the second end stop surface 202. The first end stop surface 201 and the second end stop surface 202 are configured to limit a rotation range of the working surface, and stop when the working surface moves to the first end stop surface 201 or the second end stop surface 202.

In the embodiment 1, the transmission structure 4 includes a coil 203, two supporting-free transmission portions 204, and two supporting transmission portions 205. The coil 203 surrounds the transmission shaft 31. The two supporting-free transmission portions 204 are respectively connected to two ends of the coil 203. The two supporting transmission portions 205 are respectively connected to the two supporting-free transmission portions 204. Tail ends of the two supporting transmission portions 205 are respectively fixed to the first end stop surface 201 and the second end stop surface 202. The driving unit 32 drives the transmission shaft 31 to rotate to drive the coil 203 to contract, so as to adjust positions of the first end stop surface 201 and the second end stop surface 202 at the tail ends of the two supporting transmission portions 205. The coil 203 is disposed at a periphery of the transmission shaft 31 to form a number of coils. Due to an existence of a diameter of the transmission shaft, the two supporting-free transmission portions 204 at the two ends of the transmission structure 4 are always in a disengaged state with the working surface. The two supporting transmission portions 205 make contact with the working surface 24 to achieve supporting effects.

In the embodiment 1, a driving surface 206 is formed on the periphery of the transmission shaft 31. The driving surface 206 is disposed in the coil 203 in a contact mode. The transmission structure 4 is disposed around the driving surface 206 to form a plurality of equally spaced coils.

Optionally, the driving surface 206 includes a cylindrical surface, and may also be any similar complex geometry, such as a helical groove, a cam profile, etc.

A working surface center and a driving surface center 207 have a constant instantaneous rotational radius difference over an entire allowed rotation range, thereby linearly increasing a range of rotation angle of included elements thereof, which is proportional to a range of rotation angle of the driving elements.

In order to achieve linear and monotonic transmission of motion, the coil 203 of the transmission structure 4 need to be interacted with the driving surface 206, so that a relative speed between two surfaces in contact is zero.

In the embodiment 1, the transmission structure 4 is shown as an integral cylindrical section element and is made of a fiber material. The transmission structure 4 may further be any cross-sectional geometry, a cross-section of which is composed of a plurality of cross-sectional elements. Arrangement of the plurality of the cross-sectional elements forms a complex optical fiber arrangement, such as threads, wires, ropes, or belts. If the transmission structure 4 is in a stretched state, the transmission structure 4 has a characteristic of transmitting force along its length, and if in a compressed state, the transmission structure 4 has a characteristic of crashing.

In the embodiment 1, the key body 22, the key 23, and the working surface 24 are integrally formed. Integrated structure settings make an overall structure high strength, which is convenient for installation.

In the embodiment 1, the key assembly 2 further includes at least two cylinders 5 fixed on the working surface 24. The at least two cylinders 5 are disposed at intervals, and adjacent two of the at least two cylinders 5 are disposed in a staggered manner along a direction perpendicular to the transmission shaft 31. The transmission structure 4 is sequentially wound around each of the at least two cylinders 5, and the transmission structure 4 is fixed to the tension adjusting mechanism 11.

Specifically, a plurality of the cylinders 5 are additionally disposed on the working surface 24 to change winding directions, such as a Z-shaped winding, which facilitates tensioning of the connecting belt or the connecting rope and preventing the connecting belt or the connecting rope from sliding. A number of the plurality of the cylinders 5 is two, three, or four, which is specifically selected according to actual requirements. As an improvement, the number of the plurality of the cylinders 5 may further be one, and the winding directions are changed through one cylinder 5, such as an L-shaped winding.

As an improvement, two cylinders 5 are disposed on a surface of the working surface 24 in a staggered manner, which is convenient for increasing friction of the connecting belt and improving the transmission effects.

In the embodiment 1, the base 1 includes a base body 101 and a first supporting plate 103, and the first supporting plate 103 is detachably fixed to the base body 101. The first transmission shaft 21 is respectively and detachably fixed to the base body 101 and the first supporting plate 103. The first transmission shaft 21 is respectively and rotatably connected to the base body 101 and the first supporting plate 103. The driving unit 32 drives the transmission shaft 31 to drive the transmission structure 4, so that the working surface 24 drives the first transmission shaft 21 to rotate on the first supporting plate 103, so as to generate the force feedback in response to the operation of touch or press on the key assembly 2. The first transmission shaft 21 sequentially passes through the base body 101, the key assembly 2, and the first supporting plate 103. The driving assembly 3 is disposed on one side of the base body 101, the key assembly 2 is disposed between the base body 101 and the first supporting plate 103, and the first supporting plate 103 is detachably fixed in the base body 101, which is convenient for installation of the key assembly 2 and the transmission shaft 31.

Optionally, the first supporting plate 103 is fixedly connected to a side wall, distal from the first supporting plate 103, of the base body 101 through a plurality of bolts 12. A number of the plurality of the bolts 12 is two.

In the embodiment 1, the key assembly 2 further includes first bearings 6, and the first bearings 6 are respectively sleeved on the first transmission shaft 21. Inner diameters of the two first bearings 6 are respectively fixed to two ends of the first transmission shaft 21. Outer rings of the two first bearings 6 are respectively fixed to the base body 101 and the first supporting plate 103. A function of the two first bearings 6 is to support the first transmission shaft 21 in a space relative to the base 1.

Optionally, the two first bearings 6 are ball bearings, so that the first transmission shaft 21 on the capstan and the key 23 is freely selected in the base 101 and the first supporting plate 103. The ball bearings are configured to reduce friction torque between rotating elements and fixing elements.

Embodiment 2

On a basis of the embodiment 1, the base 1 further includes a second supporting plate 104 fixed in the base body 101. The key assembly 2 further includes a side swing plate 241, a second transmission shaft 243, and a gear 242. The side swing plate 241 extends from the key body 22 along a direction close to the working surface 24. The second transmission shaft 243 is detachably fixed to the second supporting plate 104, and the second transmission shaft 243 is rotatably connected with the second supporting plate 104. The gear 242 is disposed on a side, distal from the driving unit 32, of the second supporting plate 104, and the gear 242 is fixed to the second transmission shaft 243. The working surface 24 is disposed on a side, close to the driving unit 32, of the second supporting plate 104, and the working surface 24 is fixedly connected to the second transmission shaft 243. An inner gear structure 2411 is disposed at one end, close to the gear 242, of the side swing plate 241, and the gear 242 is meshed with the inner gear structure 2411. The two ends of the transmission structure 4 are respectively wound around the working surface 24 and fixed to the two ends of the working surface 24. The transmission shaft 31 is driven to rotate through the driving assembly 3, and the transmission shaft 31 is wrapped several circles through the connecting rope or the connecting belt, the two ends of the connecting belt or the two ends of the connecting rope are respectively wound around the working surface 24 on two sides of the capstan, the working surface 24 is connected to the gear 242, and power is transmitted to the gear 242. The gear 242 is meshed with the inner gear structure 2411 on the side swing plate 241 to drive the side swing plate 241 to rotate, the side swing plate 241 is fixed to the key 23, and the key 23 rotates therewith. An output force of the driving assembly 3 is amplified and transmitted to the key 23 through the capstan and the gear 242, and a force is generated on the finger. The key 23 is driven to move in two directions, that is, the driving assembly 3 further generates a force resisting a spring, namely, a force of pulling back the key 23 is provided.

The first supporting plate 103 and the second supporting plate 104 are cooperatively disposed in the base body 101, and the first supporting plate 103 and the second supporting plate 104 are fixedly connected to the base body 101 through a plurality of bolts 12.

In the embodiment 2, the key assembly 2 further includes second bearings 7, the second bearings 7 are sleeved on two ends of the second transmission shaft 243. Inner diameters of the second bearings 7 are respectively fixed to the two ends of the second transmission shaft 243. Outer rings of the second bearings 7 are respectively fixed to the second supporting plate 104 and the base body 101. The two second bearings 7 are respectively disposed at the two ends of the second transmission shaft 243, so that rotation of the second transmission shaft 243 is smoother, friction force is effectively reduced, and the force feedback effects of the transmission shaft 31 are good.

Optionally, the second bearings 7 are bearings, so that the second transmission shaft 243 on the capstan and the key 23 rotates in the bearings, which reduces the friction force. As an improvement, other materials, such as PTFE, PC, POM and the like, are further used.

Furthermore, the bearings are ball bearings, transmission effects between the ball bearings and the second transmission shaft 243 are good, which reduces the friction force.

In the embodiment 2, the key assembly 2 further includes a position sensor 9, the position sensor 9 is fixed on the base 1, and the position sensor 9 is connected to one end of one of the first transmission shaft 21. The first transmission shaft 21 is fixedly connected to the key body 22. Tail ends of the first transmission shaft are connected to the position sensor 9. The first transmission shaft is rotated through pressing the key 23. An angle of rotation of the first transmission shaft is obtained through the position sensor 9, so that rotation positions of the key 23 are obtained, and position detection is good.

In the embodiment 2, the force feedback device further includes torsion springs 10. The torsion springs 10 are respectively sleeved on the first transmission shaft 21. A first end of each of the torsion springs 10 abuts against the key 23, and a second end of each of the torsion springs 10 abuts against a lower end of the base 1. The torsion springs 10 are disposed on one side of the key 23, so that the torsion springs 10 provide a resilience force to the key 23 when the driving assembly 3 is not in effect, and meanwhile, an initial force of the key 23 is ensured, so that when a trigger does not work, the initial force serves as a restraining force on the key 23, and the key 23 is ensured to be good in experience effect. The force feedback device of the present invention provides a resistance to the key 23 after a finger action, meanwhile, the force feedback device further pulls back the key 23, which provides bidirectional forces, and the force feedback effects are good.

In the embodiment 2, a tension adjusting mechanism 11 is dispose on a first end of the working surface 24, a fixing end is disposed on a second end of the working surface 24. A first end of the transmission structure 4 is connected to the tension adjusting mechanism 11, and a second end of the transmission structure 4 is connected to the fixing end.

Optionally, the tension adjusting mechanism 11 is a tension adjusting screw, the tension adjusting mechanism 11 is connected to two ends of the connecting belt, which is configured to adjust a tensioning degree of the connecting belt.

In the embodiment 2, the driving assembly 3 further includes a coupler 33, the coupler 33 is fixedly connected to an output end of the driving unit 32. One end, distal from the driving unit 32, of the coupler 33 is fixedly connected to one end of the transmission shaft 31. As an improvement, the transmission shaft 31 is directly connected to an output end of the driving unit 32, or the transmission shaft 31 is connected to the output end of the driving unit 32 through the coupler 33, or the transmission shaft 31 is a portion of an output shaft of the driving unit 32.

Specifically, the driving assembly 3 further includes two third bearings 8, and the two third bearings 8 are sleeved on the transmission shaft 31. The two third bearings 8 are respectively sleeved at two ends of the transmission shaft 31. The two third bearings 8 are respectively fixed on the base 1 and the first supporting plate 103.

Optionally, the driving unit 32 is a motor, and the third bearings 8 are bearings, so that the transmission shaft 31 rotates in the bearings, which reduces the friction force, and further improves an output force of the motor. As an improvement, other materials having good surface lubrication, such as PTFE, PC, POM and the like, are further used.

Furthermore, the bearings are ball bearings, transmission effects between the ball bearings and the transmission shaft 31 are good, and the friction force is reduced.

Compared with related art, the working body of the force feedback device of the present invention includes the key assembly and the working surface. The working surface is disposed on the key assembly. The working body is rotatably connected to the base through a first transmission shaft. The driving assembly is rotatably disposed on the base. The driving assembly is disposed opposite to the working surface. The transmission structure is disposed on the working surface. The transmission structure is in transmission connection with the driving assembly. The two ends of the transmission structure respectively extend along the working surface. The two ends of the transmission structure are fixed to two ends of the working surface. The driving assembly drives the transmission structure to adjust the working surface to rotate around the first transmission shaft, so as to generate the force feedback in response to the operation of touch or press on the key assembly. When touching or pressing the key assembly, the driving assembly provides forward and reverse rotation to drive the transmission structure to realize force feedback effects, which is compact in overall space, small in friction resistance, and facilitates user experience effect.

Above descriptions are merely embodiments of the present invention. It should be noted that, for a person of ordinary skill in the art, improvements are made without departing from concepts of the present invention, but the improvements are all within a protection scope of the present invention.

What is claimed is:

1. A force feedback device, comprising:
a base;
a working body;
a driving assembly; and
a transmission structure;
wherein the working body comprises a key assembly and a working surface, the working surface is disposed on the key assembly, the working body is rotatably connected to the base through a first transmission shaft;
the driving assembly is rotatably disposed on the base, the driving assembly is disposed opposite to the working surface; and
the transmission structure is disposed on the working surface, the transmission structure is in transmission connection with the driving assembly, two ends of the transmission structure respectively extend along the working surface, and the two ends of the transmission structure are fixed to two ends of the working surface; and the driving assembly drives the transmission structure to adjust the working surface to rotate around the first transmission shaft, so as to generate force feedback in response to operation of touch or press on the key assembly.

2. The force feedback device according to claim 1, wherein the transmission structure is a connecting belt or a connecting rope.

3. The force feedback device according to claim 1, wherein two opposite ends of the working surface comprise a first end stop surface and a second end stop surface, and the two ends of the transmission structure are respectively fixed to the first end stop surface and the second end stop surface.

4. The force feedback device according to claim 3, wherein the driving assembly comprises a driving unit and a transmission shaft, the driving unit is fixed to one side of the base, the transmission shaft is connected to the driving unit, the transmission shaft is rotatably disposed on the base and is opposite to the working surface; and the driving unit drives the transmission shaft to drive the transmission structure to adjust rotation of the working surface, so as to generate the force feedback in response to the operation of touch or press on the key assembly.

5. The force feedback device according to claim 4, wherein the transmission structure comprises a coil, two supporting-free transmission portions, and two supporting transmission portions; the coil surrounds the transmission shaft, the two supporting-free transmission portions are respectively connected to two ends of the coil, the two supporting transmission portions are respectively connected to the two supporting-free transmission portions, tail ends of the two supporting transmission portions are respectively fixed to the first end stop surface and the second end stop surface; and the driving unit drives the transmission shaft to rotate to drive the coil to contract, so as to adjust positions of the first end stop surface and the second end stop surface at the tail ends of the two supporting transmission portions.

6. The force feedback device according to claim 5, wherein a driving surface is formed on a periphery of the transmission shaft, the driving surface is directly disposed in the coil, and the transmission shaft rotates to enable the driving surface to drive the coil to move, so as to adjust positions of the two supporting-free transmission portions.

7. The force feedback device according to claim 5, wherein the key assembly comprises a key body and a key, the key is formed by extending a peripheral side of the key body, the working surface comprises an arc-shaped periphery, and the working surface is disposed on the key body; the key body is rotatably connected to the base through the first transmission shaft.

8. The force feedback device according to claim 7, wherein the key body, the key, and the working surface are integrally formed.

9. The force feedback device according to claim 7, wherein the key assembly further comprises at least two cylinders fixed on the working surface, the at least two cylinders are disposed at intervals, and adjacent two of the at least two cylinders are disposed in a staggered manner along a direction perpendicular to the transmission shaft, the transmission structure is sequentially wound around each of the at least two cylinders, and the transmission structure is further fixed to an end portion of the working surface.

10. The force feedback device according to claim 9, wherein the at least two cylinders are disposed on a same side of the transmission shaft.

11. The force feedback device according to claim 7, wherein the base comprises a base body and a first supporting plate, the first supporting plate is formed by the base body, the first transmission shaft is supported respectively on the base body and the first supporting plate to form respective rotatable connection; the driving unit drives the transmission shaft to drive the transmission structure, so that the working surface drives the first transmission shaft to rotate on the first supporting plate to generate the force feedback in response to the operation of touch or press on the key assembly.

12. The force feedback device according to claim 11, wherein the key assembly further comprises first bearings, the first bearings are respectively fixed to the first transmission shaft and are sleeved on the first transmission shaft, and the key assembly is respectively and rotatably connected to the base body and the first supporting plate through the first bearings.

13. The force feedback device according to claim 11, wherein the base further comprises a second supporting plate fixed in the base body, the key assembly further comprises a side swing plate, a second transmission shaft, and a gear; the side swing plate extends from the key body along a direction close to the working surface, the second transmission shaft is supported on the second supporting plate to form rotatable connection; the gear is disposed on a side, distal from the driving unit, of the second supporting plate, and the gear is fixed to the second transmission shaft; the working surface is disposed on a side, close to the driving unit, of the second supporting plate, and the working surface is fixedly connected to the second transmission shaft; an inner gear structure is disposed at one end, close to the gear, of the side swing plate; and the gear is meshed with the inner gear structure.

14. The force feedback device according to claim 1, wherein the force feedback device further comprises a position sensor, the position sensor is fixed on the base, and the position sensor is connected to one end of the first transmission shaft.

15. The force feedback device according to claim 7, wherein the force feedback device further comprises torsion springs, the torsion springs are respectively sleeved on the first transmission shaft, a first end of each of the torsion springs abuts against the key, and a second end of each of the torsion springs abuts against the base.

16. The force feedback device according to claim 1, wherein two tension adjusting mechanisms are further disposed on two opposite ends of the working surface, and the two ends of the transmission structure are respectively connected to the two tension adjusting mechanisms.

* * * * *